H. M. NICHOLS.
METHOD OF EXTRACTING WAX.
APPLICATION FILED MAR. 7, 1919.
1,356,550.
Patented Oct. 26, 1920.
5 SHEETS—SHEET 1.
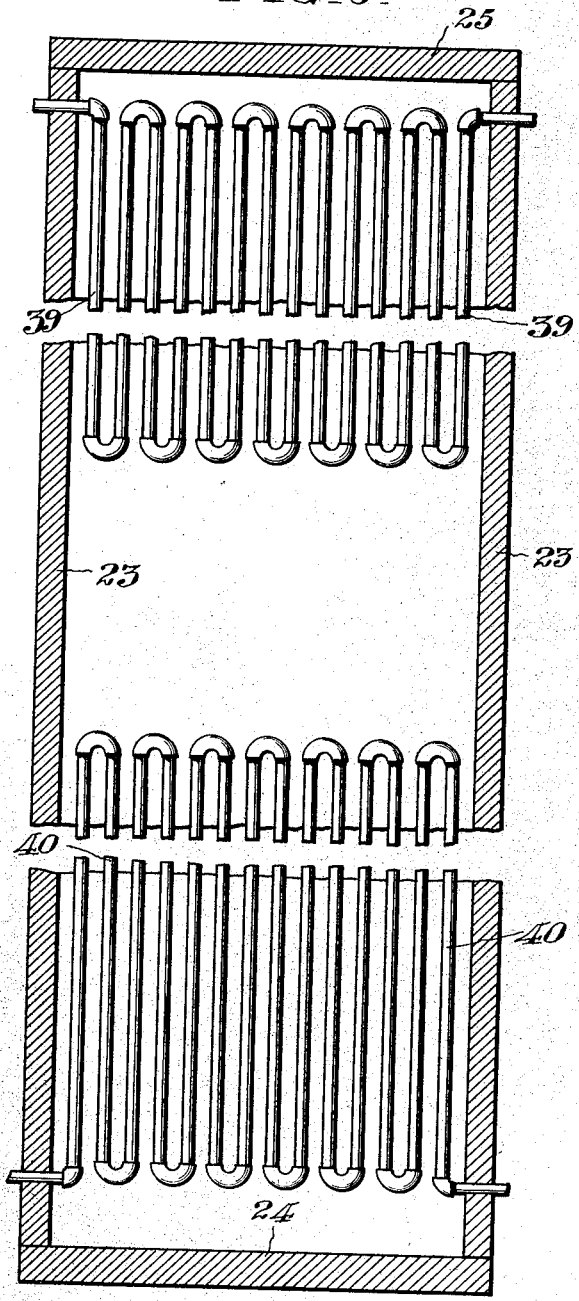
FIG. 6.
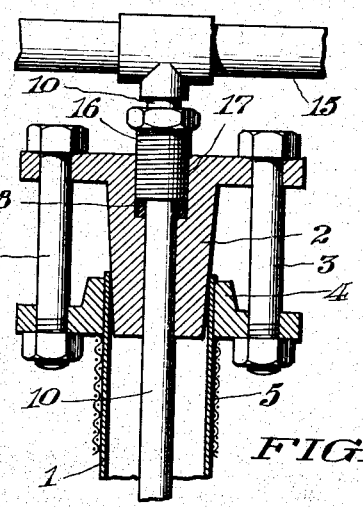
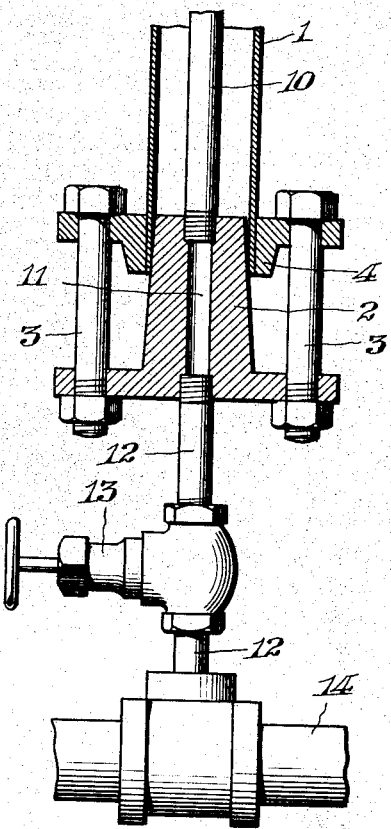
FIG. 1.
INVENTOR
Howard M. Nichols
BY
Cornelius D. Ehret
his ATTORNEY.

H. M. NICHOLS.
METHOD OF EXTRACTING WAX.
APPLICATION FILED MAR. 7, 1919.
1,356,550.
Patented Oct. 26, 1920.
5 SHEETS—SHEET 2.
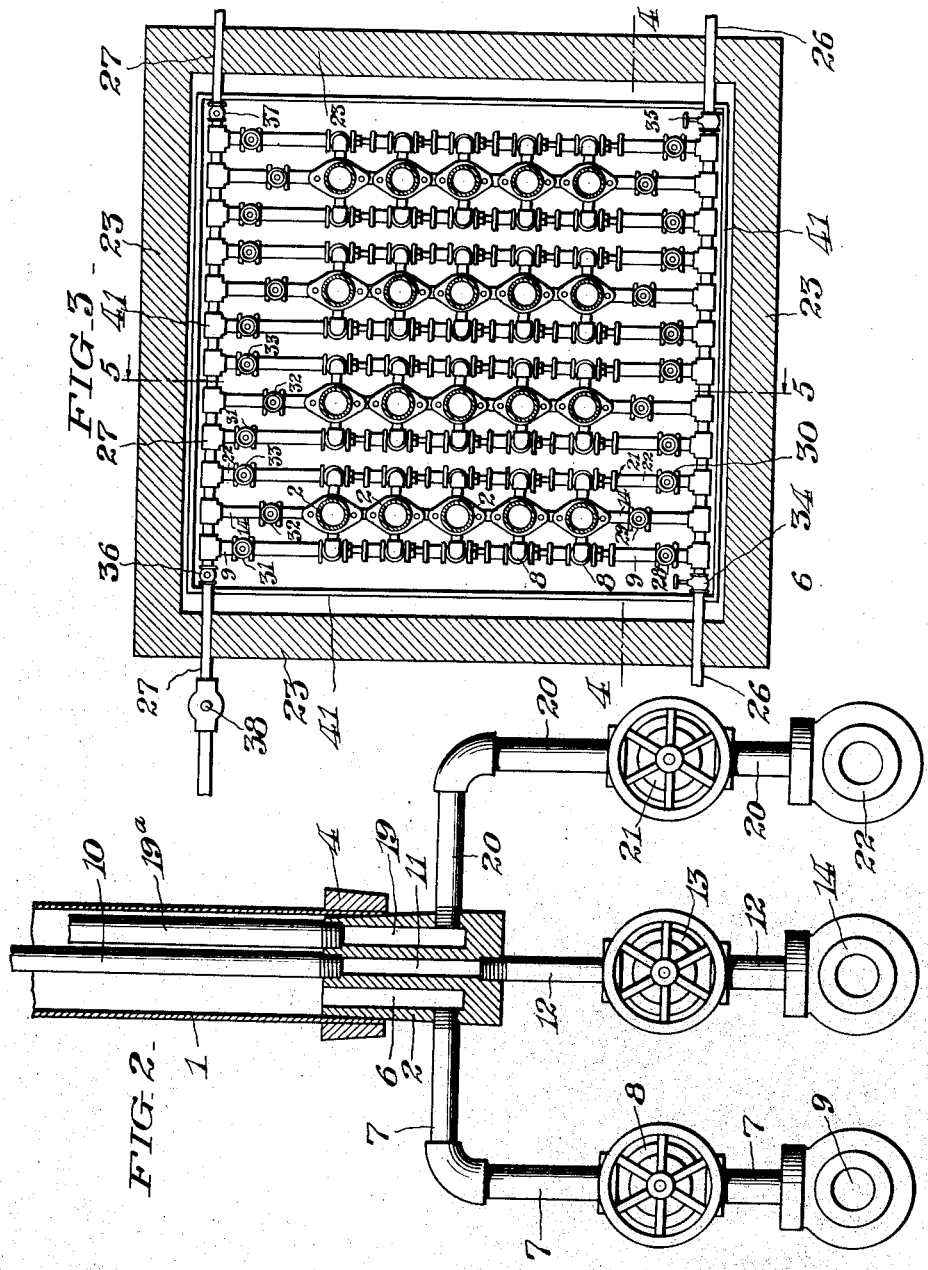
INVENTOR
Howard M. Nichols
BY
Cornelius D. Ehret
his ATTORNEY.

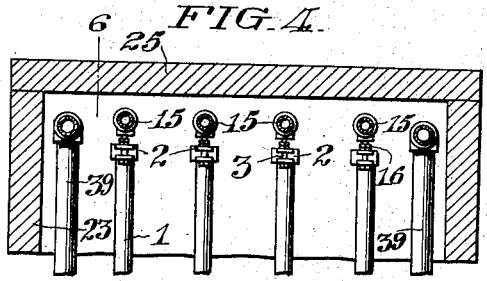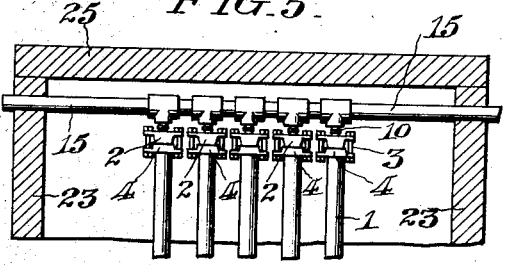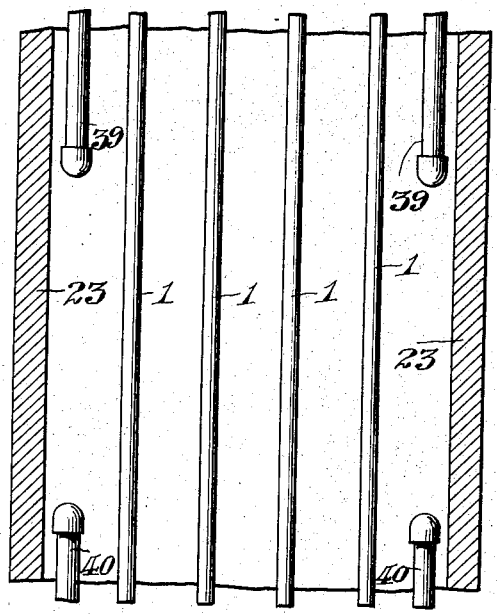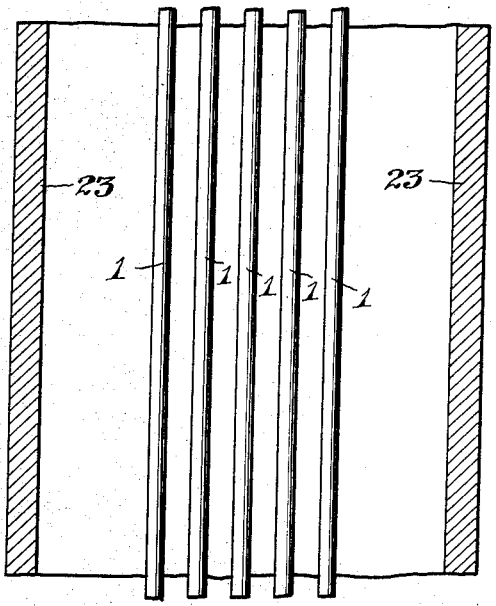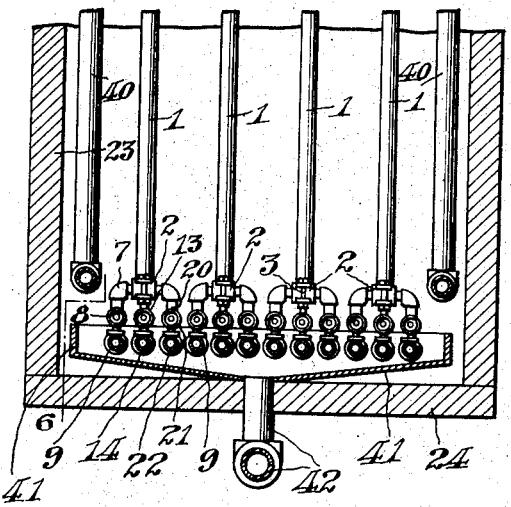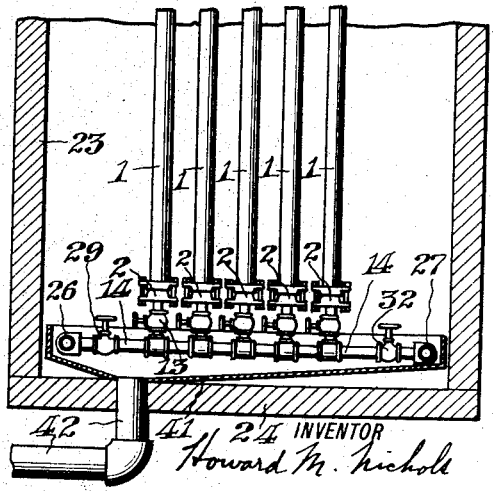

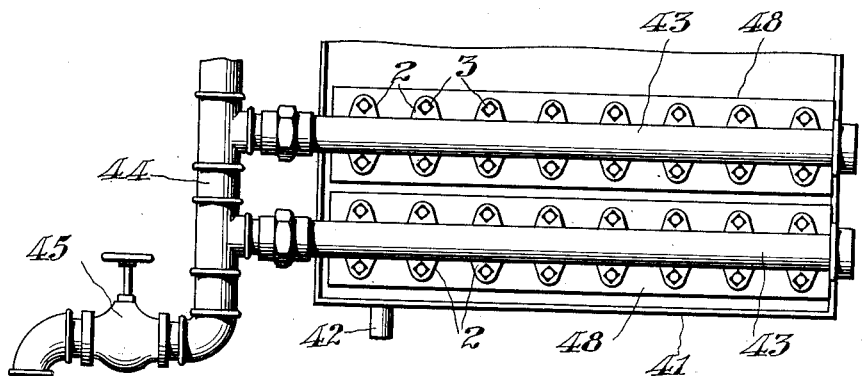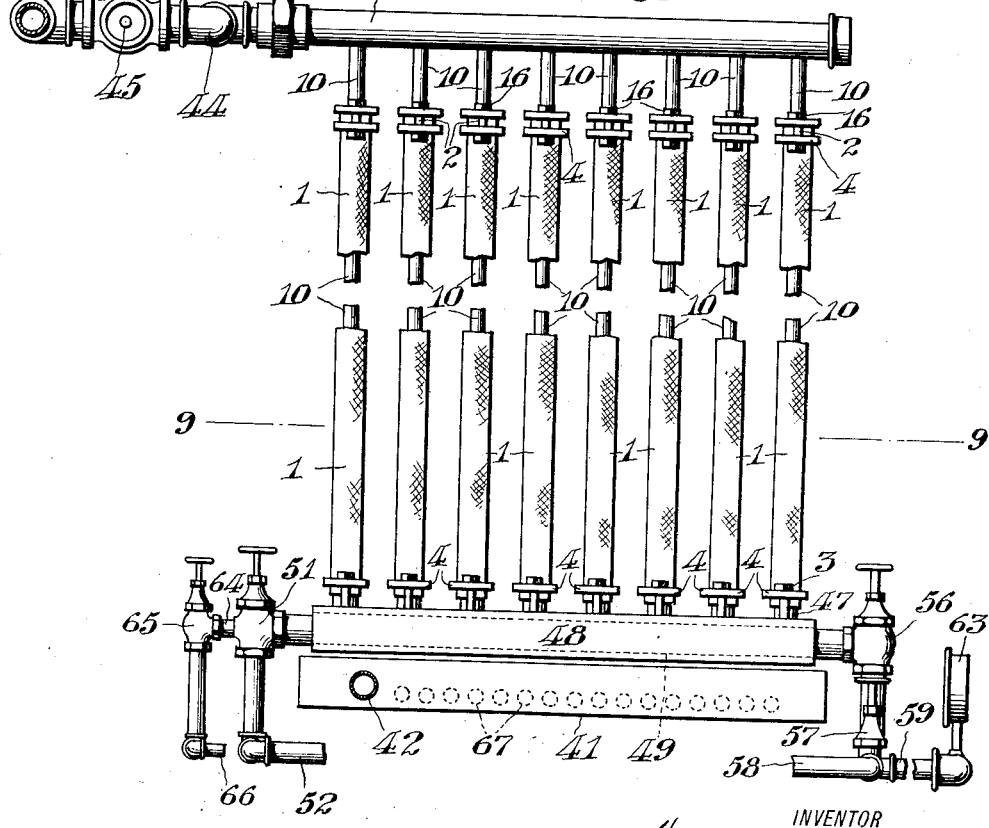

UNITED STATES PATENT OFFICE.

HOWARD M. NICHOLS, OF SWARTHMORE, PENNSYLVANIA, ASSIGNOR TO THE ATLANTIC REFINING COMPANY, OF PHILADELPHIA, PENNSYLVANIA, A CORPORATION OF PENNSYLVANIA.

METHOD OF EXTRACTING WAX.

1,356,550.                     Specification of Letters Patent.     Patented Oct. 26, 1920.

Original application filed February 25, 1918, Serial No. 218,994. Divided and this application filed March 7, 1919. Serial No. 281,263.

*To all whom it may concern:*

Be it known that I, HOWARD M. NICHOLS, a citizen of the United States, residing at Swarthmore, county of Delaware, State of Pennsylvania, have invented a new and useful Method of Extracting Wax, of which the following is a specification.

My invention relates to a method of filtering material from a liquid, and particularly for extracting wax, tallow or other readily fusible solids from a liquid, as oil, and more particularly for the extraction of paraffin wax from paraffin petroleum distillate.

This application is a division of my application Serial Number 218,994, filed February 25, 1918, now Patent No. 1,302,832.

In accordance with my method, the liquid containing the material to be extracted therefrom is forced under suitable pressure into a chamber having a wall consisting of a suitable filtering medium, as fabric, of small heat capacity and low heat conductivity, disposed in a surrounding atmosphere which has free and direct access to and contact with the filtering medium throughout substantially its entire surface or area, the material to be extracted collecting upon one side of the filtering medium and the liquid filtrate passing through the filtering medium to the opposite side thereof into the surrounding atmosphere.

In the case of wax, tallow or like materials the liquid, as oil, containing the same may be suitably chilled to cause the more ready separation on the filtering medium; and in such case the atmosphere surrounding the filtering medium is maintained at any suitable low temperature equal to, lower or higher than the temperature of the chilled liquid operated upon.

When the extracted material is of a character which readily melts or fuses, as in the case of wax, tallow or the like, it is preferably removed by melting it while on the filtering medium and drawing it off in liquid form, and thereafter solidified by cooling.

When the extracted material is wax, tallow or the like containing oil or similar liquid, it may be brought to a temperature suitable for sweating out the oil or contained liquid while on the filtering medium, and thereafter melted and drawn off therefrom in liquid form. Preferably, however, the material of such character is immediately melted and drawn off from the filtering medium and the sweating operation conducted at a later stage.

For practising my method, the filter structure consists of a chamber formed substantially entirely by a fabric or equivalent filtering medium which has small heat capacity and low heat conductivity and which is supported relatively free and independently of plates or parts of metal or other material of relatively high heat conductivity and capacity and is surrounded by a free atmosphere without closely approaching parts of metal or other material of high heat conductivity and high heat capacity. By employment of such structure, the wax or other material is readily extracted from the oil or other liquid, and there is effected an economy in the energy employed for maintaining the filtering apparatus at the necessary low temperature because of the small amount of heat which can flow into the apparatus because of its small heat capacity. The heat content of the apparatus after the rise in temperature necessary for melting the wax or other material for its removal from the filter chamber is small, and there is correspondingly small loss upon reintroduction of chilled liquid which must again reduce the temperature of the filtering apparatus.

My invention resides in a method of the character referred to and in further features hereinafter described and claimed.

For an understanding of my method, reference is to be had to the accompanying drawings, in which:

Figure 1 is a vertical sectional view, partly in elevation, showing a single unit of wax pressing apparatus.

Fig. 2 is a vertical sectional view, partly in elevation, taken at right angles to Fig. 1.

Fig. 3 is a horizontal sectional view, partly in plan, through a housing or room in which is contained a plurality of my wax pressing units.

Fig. 4 is a vertical sectional view, some parts in elevation, taken on the line 4—4 of Fig. 3.

Fig. 5 is a vertical sectional view, some parts in elevation, taken on the line 5—5 of Fig. 3.

Fig. 6 is a vertical sectional view, some parts in elevation, taken on the line 6—6 of Fig. 4.

Fig. 7 is a top plan view of a modified form of apparatus.

Fig. 8 is a side elevational view of apparatus shown in Fig. 7.

Figure 9:
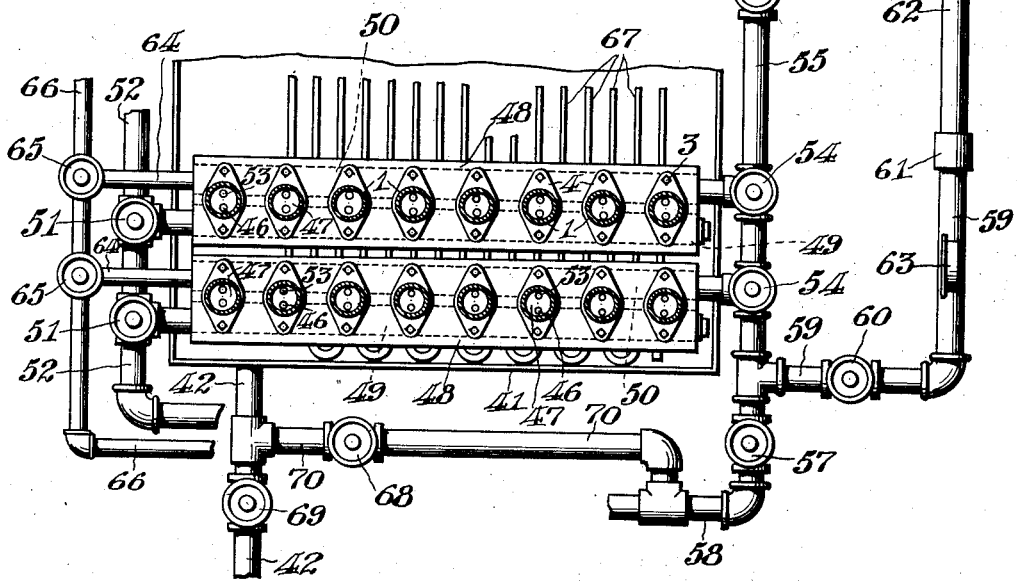
Fig. 9 is a horizontal sectional view and plan of the lower part of the apparatus of Fig. 8.

Referring to Figs. 1 and 2, 1 is a casing of suitable fabric, such as woven cotton or linen fabric, and such, for example, as employed for fabric fire hose or the like. The fabric casing 1 may be of any suitable shape or form, though tubular form is preferred, and for brevity the casing or chamber 1 is herein referred to as a tube.

The tube or hose 1 is preferably of circular cross section, though it will be understood that it may be of any other suitable cross section. It is preferably long as compared to its diameter, and as an example merely and without limiting my invention to any particular dimensions, the tube 1 may be 20 feet long, and have a diameter of 2 inches, more or less.

The tube 1 is preferably disposed in a vertical position with its upper and lower ends clamped to or otherwise suitably held in liquid tight relation with the tapered plugs or blocks 2, 2 longitudinally of which are forced the glands or clamping-members 4 by taking up upon the bolts 3. The end of the tube 1 is confined between the members 2 and 4, and as the member 4 is drawn longitudinally of the member 2, the hose is securely clamped between them, forming a pressure-tight joint.

In case exceptionally high or unusual pressures are employed, there may be disposed around and outside of the hose 1 an armor 5 of metal, fabric or cord of any suitable structure having suitable openings for passage of liquid therethrough; for example, a woven wire armor such as commonly used on air hose may be employed.

The lower plug or block 2 has therein a passage 6 communicating with the interior of the tube 1 and connecting through pipe 7 and valve 8 with a header pipe or manifold 9 connecting with the source of wax bearing oil.

Extending longitudinally of and preferably at the center of the tube 1 is the pipe 10 which at its lower end is threaded into the lower plug or block 2 in communication with the passage 11 therein, which latter at its lower end communicates through the pipe 12 and the valve 13 with the manifold or header 14 communicating with a source of any suitable heating medium, as steam, which is passed upwardly through the valve 13, pipe 12, passage 11 and pipe 10 to the exhaust manifold or header 15. At its upper end the pipe 10 extends through the upper plug or block 2 and through the gland member 16 to header 15. Member 16 is screw threaded into the hole 17 in the member 2, and within the hole 17 and beneath the gland 16 is disposed the packing material 18 which, upon advance of the gland member 16 downwardly, makes a pressure-tight connection between the pipe 10 and the block 2. By this construction expansion or contraction of pipe 10 due to temperature changes may take place without effect upon hose 1 or upper plug 2.

In the lower plug or block 2 may be provided a third passage 19, Fig. 2, communicating with the interior of the tube 1, either directly or through a tube 19ª of any suitable length screw threaded into the plug 2 and communicating with the passage 19. The passage 19 communicates through pipe 20 and valve 21 with the manifold or header 22 through which steam or any other suitable heating medium is delivered for purposes hereinafter described.

Any suitable number of hose or tubular units 1 of the character above described may be assembled in a bank as illustrated in Figs. 3, 4 and 5, within any suitable room or chamber whose side walls, bottom and roof are indicated respectively at 23, 24 and 25, all preferably of poor heat conductivity or suitably insulated against heat transfer therethrough.

Along one side near the bottom of the room is a pipe or header 26 and on the opposite side is a similarly disposed header or pipe 27. Extending between the pipes 26 and 27 are the four groups of transverse headers or pipes, each group comprising the three pipes 9, 14 and 22 hereinbefore referred to, each hose unit communicating with the headers 9, 14 and 22 through the pipes and valves as described in connection with Figs. 1 and 2. At the ends of the transverse headers 9, 14 and 22 are the valves 28, 29, 30, 31, 32 and 33. And on opposite ends of the header or pipe 26 within the room are the valves 34 and 35; and the pipe 27 is similarly controlled by valves 36 and 37, the pipe 27 having in addition a safety valve or relief valve 38 indicated in Fig. 3.

At the top of the room are disposed the horizontal pipes or headers 15 with which the pipes 10 of the several tube units communicate.

As illustrated in Figs. 4 and 6, there is disposed on each of the opposite sides near the top of the chamber a refrigerating coil 39 through which is circulated any suitable cooling medium, as for example, chilled brine.

And similarly disposed near the bottom of the chamber are the heating coils 40 through which may be circulated steam or any other suitable heating medium.

Disposed beneath the filter press units within the chamber is a pan 41 having a bottom suitably inclined toward and delivering into the draw-off pipe 42.

When necessary to repair a tube unit or to discontinue its operation for any cause, it may be isolated or taken out of service by closing its associated valves 8, 13 and 21.

Figure 10:
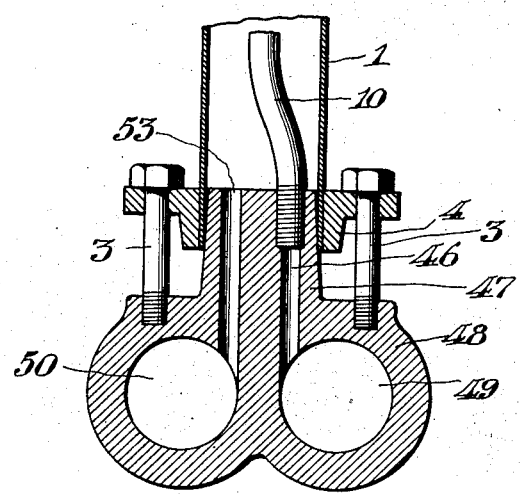
Fig. 10 is a cross sectional view, on enlarged scale, of one of the bottom manifolds of Figs. 8 and 9.

Referring to Figs. 7 to 10 inclusive, a modified and simpler structure is shown.

At the top of the apparatus are the horizontal pipes or manifolds 43, each closed at its one end at its other connected to the pipe 44, to which steam or other heating fluid is delivered through the valve 45. Connecting with each pipe 43 is a plurality of vertical pipes 10 extending, as in Fig. 1, through the gland members 16 carried by the upper plugs or blocks 2, to which the hose or tubes 1 are secured by the members 4, the pipes 10 extending to the bottom of the apparatus and into the holes 46 in the tapered plug or block members 47 cast integral with the manifold 48 having the longitudinally extending chambers 49 and 50, Fig. 10, the holes 46 communicating with the chamber 49 connected through valve 51 with the steam outlet pipe 52. The fabric tubes 1 are secured, as in Fig. 1, at their lower ends by members 4 to the blocks or plug members 47. With the chamber 50 in the manifold 48 communicates a hole 53 in each member 47, and the chambers 50 at one end communicate through the hand valves 54 with the pipe 55, controlled by hand valve 56 for delivering the wax bearing liquid into the chambers 50. The pipe 55 communicates through the valve 57 with the pipe 58, through which melted wax may be drawn off. Communicating with the pipe 55 is the pipe 59, controlled by the hand valve 60 and communicating with the relief valve 61, which communicates with the pipe 62. To the pipe 59 may be attached a pressure gage 63. With the other end of each of the chambers 50 is connected a pipe 54 communicating through hand valve 65 with the pipe 66 connected with a source of air under pressure. Beneath the manifolds 48 is disposed a pan 41 having the oil draw-off pipe 42 controlled by valve 69. From pipe 42 there is a branch pipe 70 connecting with pipe 58 and controlled by valve 68.

The mode of practising my method in accordance with Figs. 1 to 6 in extracting wax from paraffin distillate is as follows:

The valves 35 and 37 are closed and valve 36 opened. The valves 29, 30, 32 and 33 in the transverse headers 14 and 22 are closed. The valves 8, 13 and 21 of all the tube units remain open except when the unit is to be isolated or taken out of service. The valves 28 and 31 in the transverse headers 9 are opened. Thereupon the valve 34 is opened, with the result that there is delivered through the pipe 26 wax bearing oil, such as the petroleum product known as paraffin distillate, chilled to suitably low temperature, as for example, 32 degrees F. or any suitable higher or lower temperature. The wax bearing oil is pumped through the pipe 26 under any suitable pressure and is delivered into the transverse headers 9 and from them through the valves 8 and pipes 7 through the lower plugs or blocks 2 into the tubes or hose 1, completely filling them. The wax collects and is retained upon the inner walls of the fabric tubes 1 and the oil, more or less completely freed of wax, passes through the fabric walls, trickles down the outer surface thereof and collects in the pan 41 and is drawn off through the pipe 42 to any suitable point, as a storage tank.

Upon first introducing wax bearing oil into a tube 1 a low pressure on the oil suffices; but as wax collects within the tube, resistance to the flow of oil progressively increases, requiring increasing oil pressure, which may reach 125 pounds per square inch, or higher.

Should the pressure of the wax bearing oil delivered through the pie 26 exceed a predetermined value to which the relief or safety valve 38 is set, the latter will open, and allow passage of wax bearing oil through the transverse headers 9 into the header 27 through the valve 36 and relief valve 38, and thereby prevent excessive pressure within the tubes 1.

While the wax may be pressed or extracted from the wax bearing oil as above described without additional chilling of the room or chamber, it is preferred to cool the chamber by passing cold brine or other medium through the coils 39, the heating coils 40 in the meantime being inoperative. The room, and therefore the atmosphere surrounding the tubes 1, is additionally chilled, and preferably to a temperature several degrees below the temperature of the wax bearing oil delivered into the tubes. By so maintaining the surrounding atmosphere at a lower temperature, the separation of the wax from the oil within the tubes 1 occurs with greater rapidity; and the separation is more complete, as manifested by the fact that the oil delivered into the pan 41 and through the pipes 42 shows a lower cold or cloud test than in the case where the temperature external to the tubes 1 is not so maintained lower than the temperature of the wax bearing oil entering the tubes.

The delivery of wax bearing oil through the pipe 26 is continued until the tubes 1 are filled with wax, or until the deposit of wax upon the inside of the tubes has reached a desired thickness.

If it is desired to sweat out the oil contained in the wax while the latter is in the position in which deposited in the tubes 1, the valves 34 and 36 are closed, and the valve 35 opened, thereby admitting any suitable heating fluid through the right end of the pipe 26, Fig. 3. The valves 29 in the transverse headers 14 are opened, and heating fluid delivered therethrough and through the pipes 12 and passages 11 in the plugs or blocks 2 into the pipes 10 within the tubes 1, the heating fluid passing upwardly through these pipes and escaping into the header 15 and carried off thereby. The heating fluid flowing through the pipes 10 is regulated to impart to the wax a suitable temperature for causing the oil contained therein to sweat out therefrom. The oil in so separating from the wax passes outwardly through the wax and through the fabric walls of the tubes 1, trickles downwardly on the outside of the tubes, and collects in the pan 41 and is drawn off through the pipe 42.

This sweating process may be aided by shutting off the flow of chilled brine through the pipe coil 39 and passing steam or other heating medium through the lower pipe coils 40 to produce a suitable temperature within the room or chamber.

To remove the wax from the tubes 1 either in the case where the wax has first been sweated out as above described or in the case where it has not been so treated, heating fluid at sufficiently high temperature is passed in sufficient quantity through the pipes 10 as heretofore described to raise the wax to and above its melting point, whereupon it flows downwardly through the passages 6 in the lower plugs 2 through the pipes 7 and valves 8 to the transverse headers 9 and thence through the now open valve 31 into the header 27 and delivered through the now open valve 37 to any suitable point or to storage. Or for the purpose of melting the wax, the valves 30 in the transverse headers 22 are opened, whereby steam or other heating fluid flows through the valve 35 and header 26 through the valves 30 to the transverse headers 22 and thence through the pipes 20 and valves 21 through the passages 19 in the lower plugs or blocks 2 and through the short pipes 19ᵃ directly into the interior of the tubes into direct contact with the wax, which melts and flows out through the passages 6 and pipes 7, valves 8 and transverse headers 9, through pipe 27 and valve 37, as above described. Or heating fluid may be simultaneously passed through the pipes 10 and admitted through the pipes 19ᵃ for wax melting purposes.

When the tubes 1 have been cleared of wax, the operation may be repeated by again suitably setting the valves and admitting chilled wax bearing oil.

The practice of my method in accordance with Figs. 7 to 10 inclusive is in general the same as that above described. Briefly it is as follows:

By opening the valve 56 and the valves 54, the valves 65 and 57 being closed, the chilled wax bearing oil is delivered under pressure into the chambers 50, from which it rises through holes 53 into the interior of the fabric tubes 1; wax separates by collecting upon the inner wall of tube 1 and the oil passes through the fabric of the tubes 1 and trickles down into the pan 41 as hereinbefore described. With the valve 60 open, the pressure of the wax bearing oil may be read upon the gage 53. If the pressure rises above a predetermined value, the relief valve 61 opens and some of the wax bearing oil will pass off through pipe 62, back to the reservoir or tank containing the wax bearing oil to be treated. By such arrangement the tubes 1 are protected against rupture.

After wax has accumulated to suitable depth or thickness on the inner walls of the tubes 1, the valve 56 may be closed and the valves 45 and 51 opened, whereupon steam or other heating fluid will pass downwardly through the pipes 10 from the manifolds 43 into the chambers 49 of the lower manifolds 48 and through the valves 51 and out of the pipe 52. Accordingly the wax within the tubes 1 is raised in temperature to sweat out oil therefrom, which passes outwardly through the fabric tube. Or preferably, the temperature is raised to a point causing the wax to melt, whereupon it will flow downwardly through the holes 53 into the chambers 50, out through the valves 54 and 57 to the pipe 58, which carries it to its destination, where it is solidified and may later be sweated out. Thereafter the operation may be repeated by again introducing wax bearing oil through the valves 56 and 54 as above described.

When the wax is melted in the tubes 1 some escapes through them and finally collects and solidifies in the pan 41. It may there be melted by passing steam through the pipe 67, and drawn off through pipe 42 and valve 68 to pipe 58, valve 69 being closed.

Whenever desirable, the chambers 50 may be cleared of wax bearing oil or of melted wax by opening the valves 65 and admitting air or other suitable medium under pressure to blow the oil or melted wax out through valves 54, the oil being delivered back, if desired, through valve 56, or drawn off through pipe 58; and melted wax may be blown off through the valves 54 and pipe 58.

In accordance with my method of filtering wax or the like from oil or the like, the oil or liquid is chilled to suitably low temperature to cause wax or other content to crystallize or take such form as readily to be retained by the filter medium, and introducing the chilled liquid, under suitably high pressure, into a filter chamber whose wall is thermally isolated and of suitable pressure withstanding fabric or material of low heat capacity and low heat conductivity, the opposite faces of the filter medium being in free contact, respectively, with the surrounding atmosphere, which is preferably chilled, and the liquid or oil to be filtered, the operation taking place under such conditions that substantially no heat conduction can take place to the liquid while undergoing filtration. The wax or other material retained upon the filter medium is thereafter melted by suitable application of heat, and drawn off in the melted state. Thereafter chilled wax bearing oil or like liquid may be again introduced into contact with the filter medium, under conditions of practically no absorption of heat employed in the preceding wax melting operation, whereby refrigeration is economized.

In the oil before filtration the proportion of paraffin wax to oil is relatively very small as compared to the proportion of wax to oil in the material retained upon the filter fabric. The wax, collected upon the filter medium, is a mixture of wax and oil in approximately equal amounts. The oil so associated with the wax is sweated out, as described, either while the wax is retained upon the filter medium or after removal therefrom.

What I claim is:

1. The method of extracting wax from liquid, as paraffin wax from paraffin distillate, which consists in forcing chilled wax bearing liquid under pressure into contact with one side of a filtering medium whose opposite side is in free and extended contact with the surrounding atmosphere, maintaining said surrounding atmosphere at a temperature lower than the temperature of the wax bearing liquid, the wax collecting upon said filter medium and the liquid passing therethrough into said surrounding atmosphere.

2. The method of extracting fusible material from liquid, as paraffin wax from paraffin distillate, which consists in forcing chilled liquid containing the material under pressure into contact with a filter medium, whereby the material collects upon said medium, and thereafter melting the said material while on said medium and drawing the same off in liquid form.

3. The method of extracting wax from liquid, as paraffin wax from paraffin distillate, which consists in forcing chilled wax bearing liquid under pressure into contact with a filter medium, whereby wax collects thereon, raising the temperature of the wax while on said medium to sweat out liquid, as oil, and thereafter removing the wax.

4. The method of extracting wax from liquid, as paraffin wax from paraffin distillate, which consists in forcing chilled wax bearing liquid under pressure into contact with a filter medium, whereby wax collects thereon, raising the temperature of the wax while on said medium to sweat out liquid, as oil, and thereafter melting the wax and drawing it off in liquid form.

5. The method of extracting wax from liquid, as paraffin wax from paraffin distillate, which consists in forcing chilled wax bearing liquid into a fabric tube, whereby wax collects within said tube, passing a heating medium through said tube to raise the temperature of the wax, and thereafter removing the wax from said tube.

6. The method of extracting wax from liquid, as paraffin wax from paraffin distillate, which consists in forcing chilled wax bearing liquid into a fabric tube, whereby wax collects within said tube, passing a heating medium through said tube to raise the temperature of the wax to sweat out liquid, as oil, and thereafter melting the wax within the tube and drawing the same off therefrom in liquid form.

7. The method of extracting wax from liquid, as paraffin wax from paraffin distillate, which consists in forcing chilled wax bearing liquid into a fabric tube, whereby wax collects within said tube, passing a heating medium through said tube to melt the wax therein, and drawing off the wax collected therein.

8. The method of extracting wax from liquid, as paraffin wax from paraffin distillate, which consists in chilling the wax bearing liquid, filtering the liquid while chilled and under pressure through a pressure withstanding filter medium of low heat conductivity and capacity whose opposite sides are respectively in free and extended contact with the surrounding atmosphere and with the wax bearing liquid, and chilling the surrounding atmosphere to a temperature lower than the temperature of the wax bearing liquid while undergoing filtration.

9. The method of extracting wax from liquid, as paraffin wax from paraffin distillate, which consists in chilling the wax bearing liquid, filtering the liquid while chilled and under pressure through a pressure withstanding filter medium of low heat conductivity and capacity whose opposite sides are respectively in free and extended contact with the surrounding atmosphere and with the wax bearing liquid, and removing the wax and associated liquid from said filter medium by melting the wax and drawing off the melted wax and associated oil.

10. The method of extracting paraffin wax from paraffin distillate, which consists in chilling the wax bearing oil, filtering the oil while chilled and under pressure through a pressure withstanding filter medium of low heat conductivity and capacity whose opposite sides are respectively in free and extended contact with the surrounding atmosphere and with the wax bearing oil, removing the wax and associated oil from said filter medium by melting the wax and drawing off the melted wax and associated oil, and thereafter separating the wax from the associated oil.

11. The method of extracting paraffin wax from paraffin distillate, which consists in chilling the wax bearing oil, filtering the oil while chilled and under pressure through a pressure withstanding filter medium of low heat conductivity and capacity whose opposite sides are respectively in free and extended contact with the surrounding atmosphere and with the wax bearing oil, applying heat to the wax and associated oil held on said filter medium from the side of said filter medium on which said wax and oil have accumulated, and drawing off the melted wax and the associated oil.

12. The method of extracting paraffin wax from paraffin distillate, which consists in chilling the wax bearing oil to low temperature, forcing the chilled oil under pressure into a fabric pressure withstanding tube whose outer and inner surfaces are respectively in free and extended contact with the surrounding atmosphere and with the wax bearing oil, collecting the wax upon the inner surface of said tube, forcing the oil through the fabric wall of said tube into contact with the surrounding atmosphere, and removing the accumulated wax and associated oil by melting the wax and drawing it off in liquid form with the associated oil.

In testimony whereof I have hereunto affixed my signature this 5th day of March, 1919.

HOWARD M. NICHOLS.